(12) United States Patent
Liu

(10) Patent No.: US 10,730,665 B2
(45) Date of Patent: Aug. 4, 2020

(54) CONTAINING DEVICE HAVING SLIDABLE HANDLE

(71) Applicant: FREE-FREE INDUSTRIAL CORP, Taipei (TW)

(72) Inventor: Sheng-Yu Liu, Taipei (TW)

(73) Assignee: FREE-FREE INDUSTRIAL CORP, Taipei (TW)

(*) Notice: Subject to any disclaimer, the term of this patent is extended or adjusted under 35 U.S.C. 154(b) by 0 days.

(21) Appl. No.: 16/205,127

(22) Filed: Nov. 29, 2018

(65) Prior Publication Data

US 2019/0233168 A1    Aug. 1, 2019

(30) Foreign Application Priority Data

Jan. 30, 2018    (TW) .............................. 107103265 A

(51) Int. Cl.
| | |
|---|---|
| *B65D 25/28* | (2006.01) |
| *A45C 13/26* | (2006.01) |
| *A45C 11/20* | (2006.01) |
| *A47J 47/14* | (2006.01) |
| *B65D 25/32* | (2006.01) |

(52) U.S. Cl.
CPC .......... *B65D 25/2835* (2013.01); *A45C 11/20* (2013.01); *A45C 13/26* (2013.01); *A47J 47/14* (2013.01); *B65D 2525/287* (2013.01)

(58) Field of Classification Search
CPC .......... B65D 25/2835; B65D 2525/287; A45C 11/20; A45C 13/26; A47J 47/14
USPC ....... 220/757, 756, 759, 762, 763, 764, 768, 220/318, 776
See application file for complete search history.

(56) References Cited

U.S. PATENT DOCUMENTS

| | | | | |
|---|---|---|---|---|
| 1,328,672 A | * | 1/1920 | Hirsohn ................. | B65D 25/32 220/811 |
| 2,665,822 A | * | 1/1954 | Crawford ............... | B65D 45/28 220/324 |
| 3,000,535 A | * | 9/1961 | Erdmann ............... | A45C 13/10 220/318 |
| 5,469,986 A | * | 11/1995 | Jang ........................ | B65D 1/38 220/760 |
| 6,059,114 A | * | 5/2000 | Loftus ................. | B65D 21/062 206/506 |

(Continued)

*Primary Examiner* — J. Gregory Pickett
*Assistant Examiner* — Niki M Eloshway
(74) *Attorney, Agent, or Firm* — Chun-Ming Shih; HDLS IPR Services

(57) ABSTRACT

A containing device having a slidable handle includes a container (1) and a handle (2). The container (1) includes a first surface (114), a second surface (115) and at least one sliding slot (14) extended from the first surface (114) to the second surface (115). The sliding slot (14) includes a first sliding section (141) arranged corresponding to the first surface (114), a second sliding section (142) arranged corresponding to the second surface (115), and a turning section (143) connected between the first sliding section (141) and the second sliding section (142). The handle (2) movable along the at least one sliding slot (14) is assembled to the container (1). The structure allows a user to hold the handle (2) from the first surface (114) or the second surface (115), so that a lifting direction of the containing device can be changed. Accordingly, it is convenient to carry and use the containing device.

14 Claims, 10 Drawing Sheets

(56) References Cited

U.S. PATENT DOCUMENTS

| | | | | |
|---|---|---|---|---|
| 6,116,452 A | * | 9/2000 | Hamel | A61L 2/26 206/370 |
| 8,061,492 B2 | * | 11/2011 | Riedel | A45C 5/03 190/118 |
| 8,561,835 B2 | * | 10/2013 | Hansen | A47J 36/06 220/298 |
| 2012/0132664 A1 | * | 5/2012 | Kobayashi | A45F 5/102 220/759 |

* cited by examiner

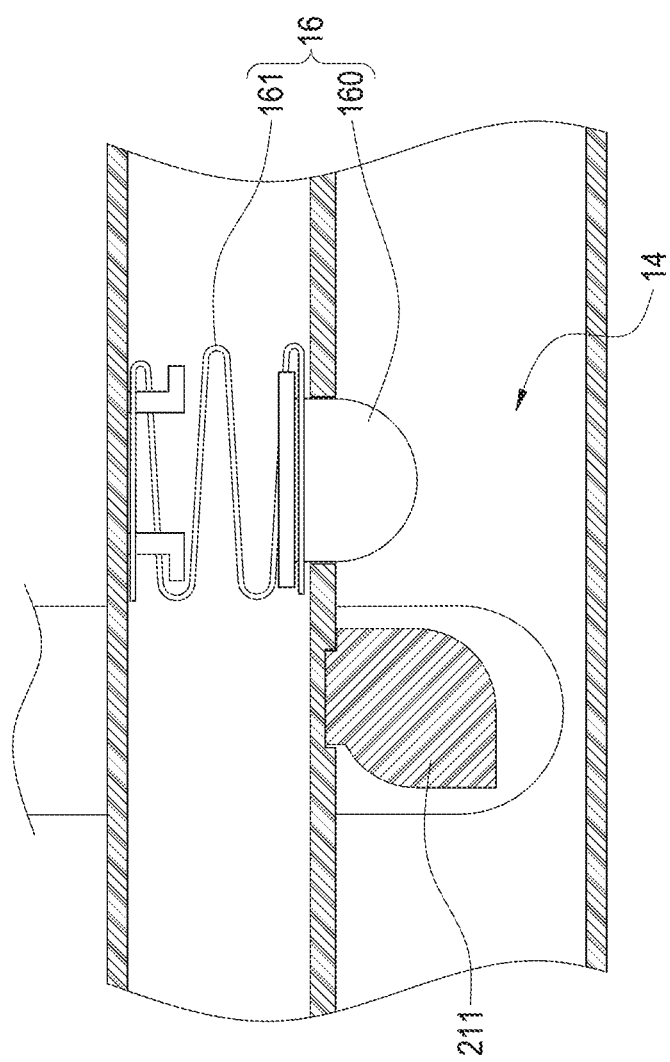

CONTAINING DEVICE HAVING SLIDABLE HANDLE

TECHNICAL FIELD

The present invention relates to a containing device, and particularly to a containing device having a slidable handle for carrying.

BACKGROUND

Conventionally, a container with a handle includes a containing body having a storage space, a cover for closing the storage space, and a handle that is pivotally mounted to the cover at a certain position. The container can be easily lifted simply through the handle.

Although the conventional container can be carried and moved by using the handle, many containers are not cubes. In the case of a container for containing food, its storage space usually has a large cross section. In other words, the storage space has a large opening, but a depth of the storage space is usually shallow. When food is placed in the storage space, and the user lifts the handle on the cover, the food is not displaced or mixed, so the food can be carried safely. However, when there is no food placed inside the container, or the food placed inside is not suitable for being stacked one above another, it is inconvenient to carry the container since a lifting direction of the container is not changeable but a width of the container is too wide and even protrudes beyond the width of the user's body.

SUMMARY

It is an objective of the present invention to provide a containing device having a slidable handle, whereby the slidable handle can be changed to a different position on the containing device according to needs, so that a user can carry the containing device conveniently.

The containing device includes a container and a handle. The container includes a first surface, a second surface, and at least one sliding slot extended from the first surface to the second surface. The sliding slot includes a first sliding section disposed corresponding to the first surface, a second sliding section disposed corresponding to the second surface, and a turning section connected between the first sliding section and the second sliding section. The handle movable along the at least one sliding slot is assembled to the container.

The present invention has advantages as follows. By using the foregoing structure, the user can move the handle to the first surface or the second surface, so as to change a lifting direction of the container device, and carry the containing device conveniently.

BRIEF DESCRIPTION OF THE DRAWINGS

The disclosure will become more fully understood from the detailed description and the drawings given herein below for illustration only, and thus does not limit the disclosure, wherein:

FIG. 10 is a schematic view illustrating an elastic restriction member of the containing device.

DETAILED DESCRIPTION

Detailed descriptions and technical contents of the present disclosure are illustrated below in conjunction with the accompanying drawings. However, it is to be understood that the descriptions and the accompanying drawings disclosed herein are merely illustrative and exemplary and not intended to limit the scope of the present disclosure.

Figure 1:
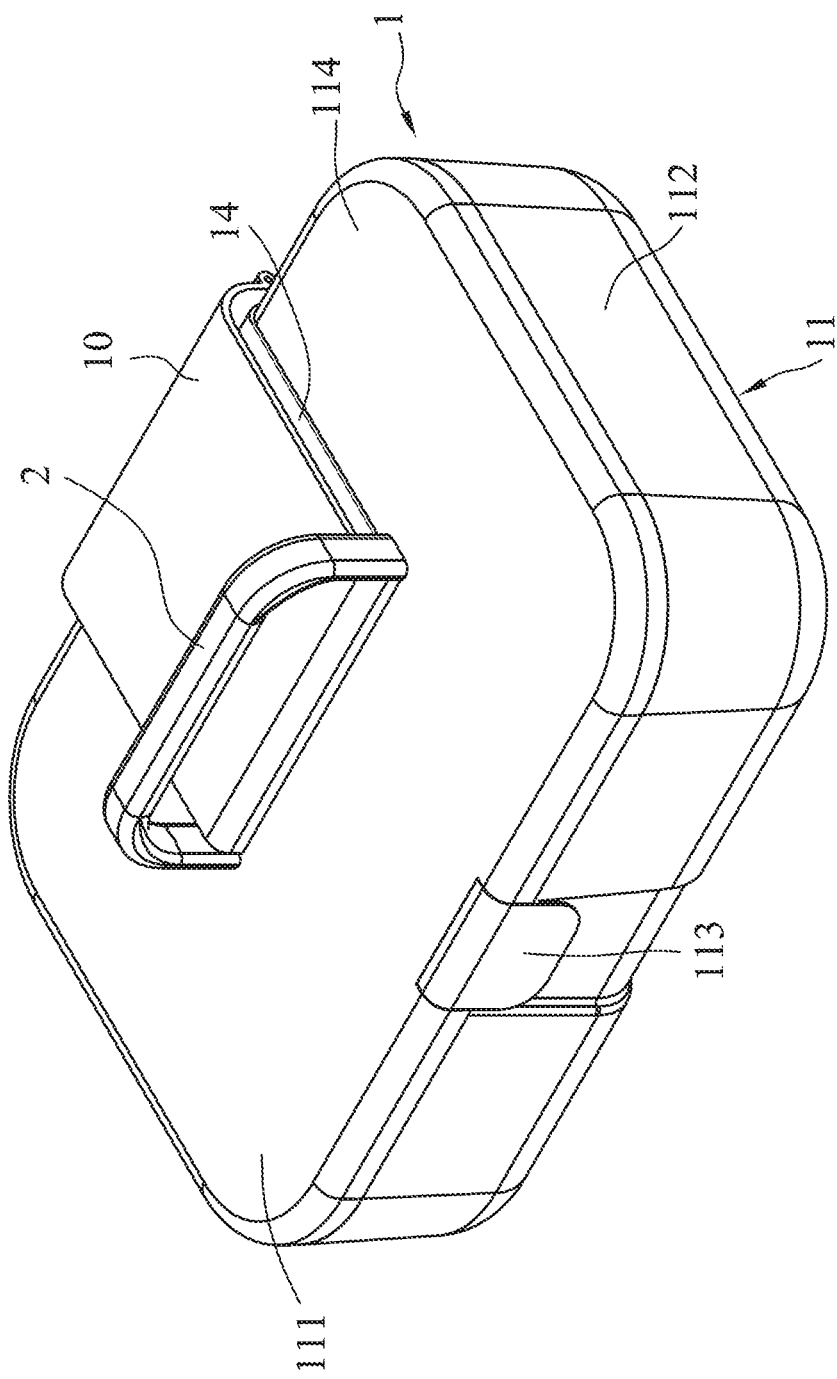
FIG. 1 is a perspective view illustrating a containing device in a first carrying position according to a first embodiment of the present invention.
Figure 2:
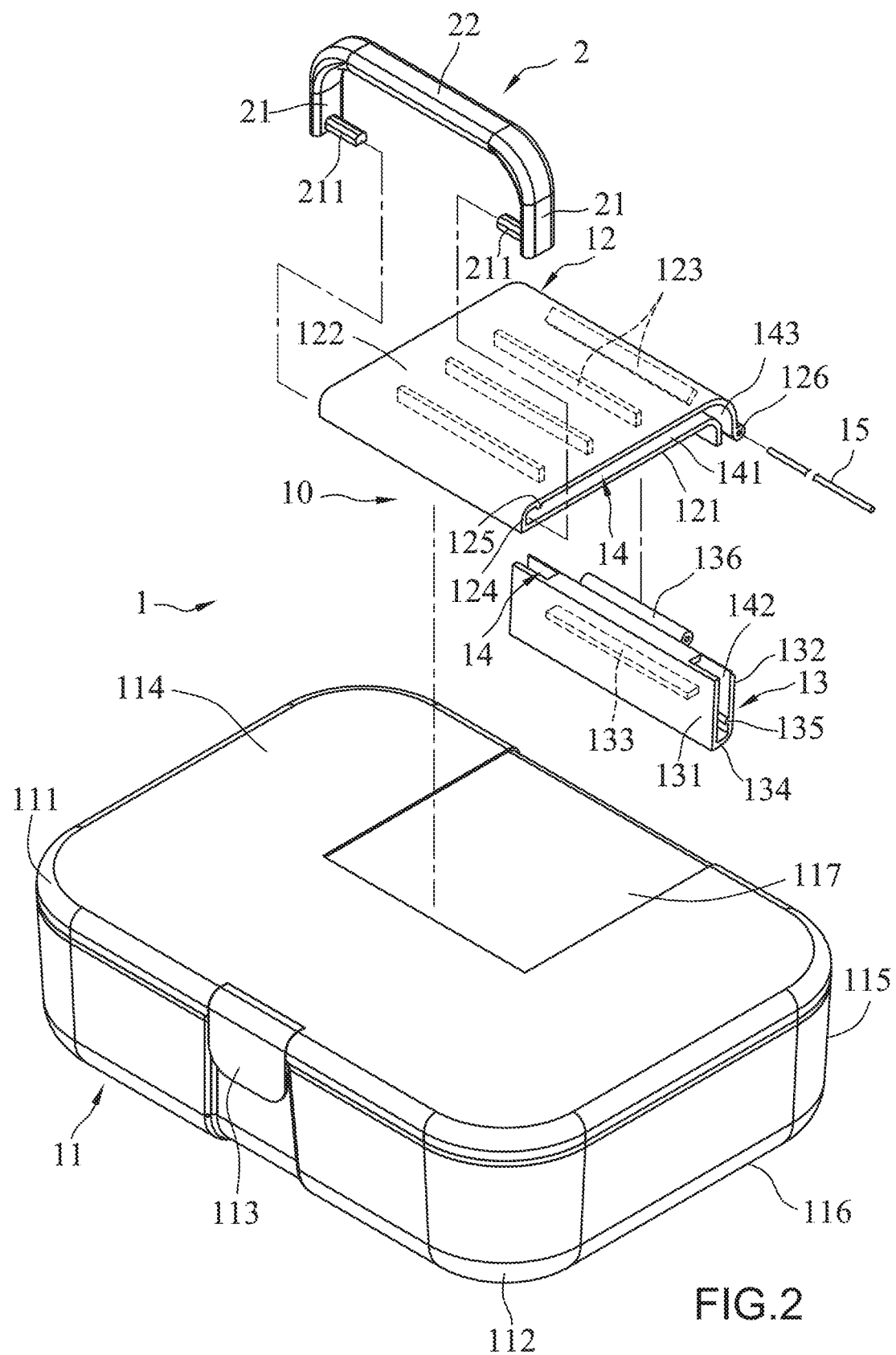
FIG. 2 is a partially exploded perspective view illustrating the containing device according to the first embodiment of the present invention.
Figure 3:
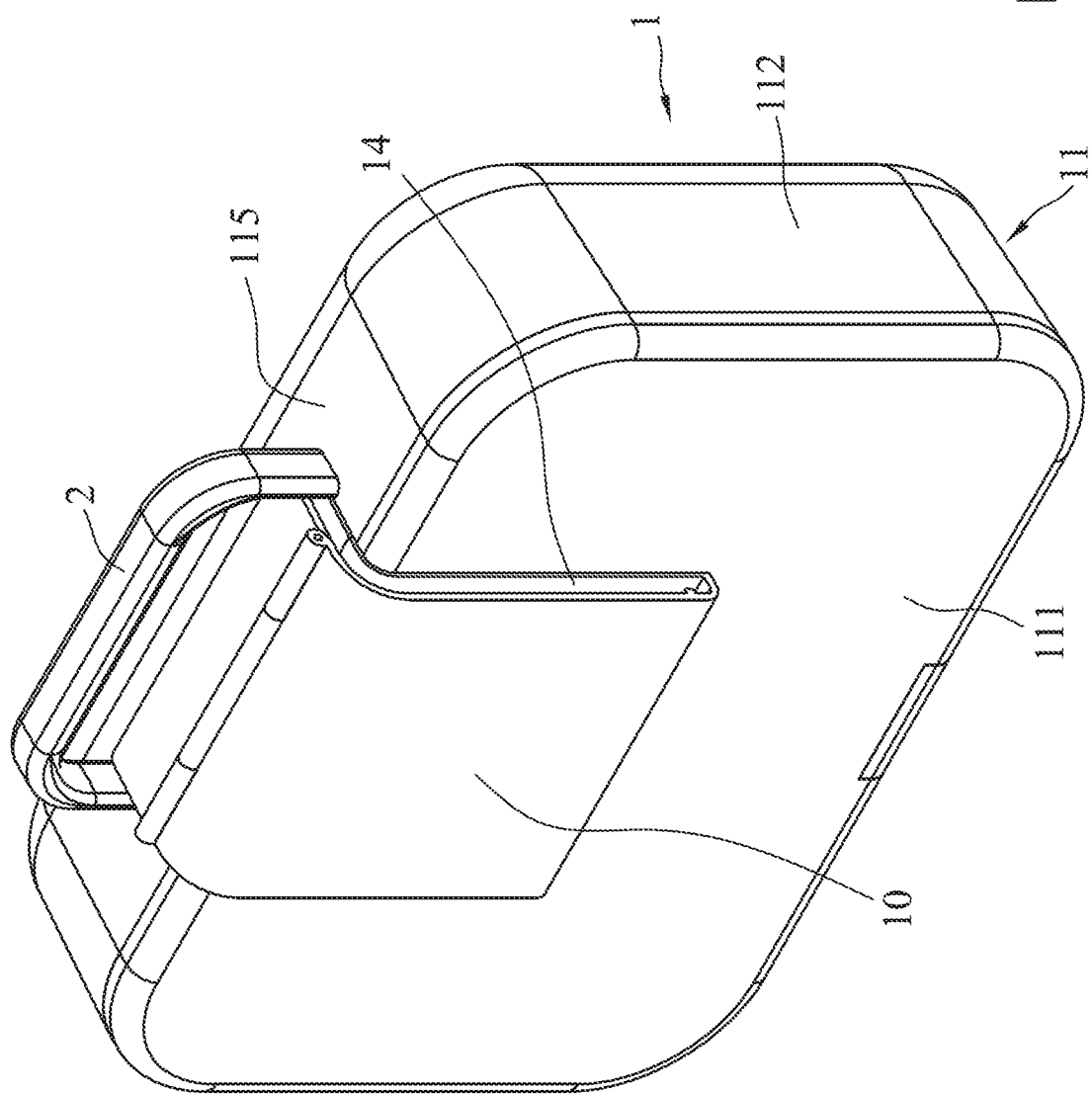
FIG. 3 is another perspective view illustrating the containing device in a second carrying position according to the first embodiment of the present invention.

Referring to FIGS. 1, 2 and 3 illustrating a containing device according to a first embodiment of the present invention, the containing device can be switched between a first carrying position shown in FIG. 1 and a second carrying position shown in FIG. 3. The containing device includes a container 1 and a handle 2 slidably mounted to the container 1. The container 1 includes a storage base 11 that can accommodate articles, and includes a sliding rail unit 10. The storage base 11 has a first base body 111, a second base body 112 that is openably covered by the first base body 111, and a fastening assembly 113 for joining together the first base body 111 and the second base body 112. The fastening assembly 113 can be a combination of a buckle plate and a buckle bar as shown in the present embodiment; however, the fastening assembly 113 may also be in other form, and the present invention is not limited in this regard. The improvement of the present invention is irrelevant to the structure of the fastening assembly 113, so a detailed description of the structure of the fastening assembly 113 is omitted herein for brevity.

Figure 4:
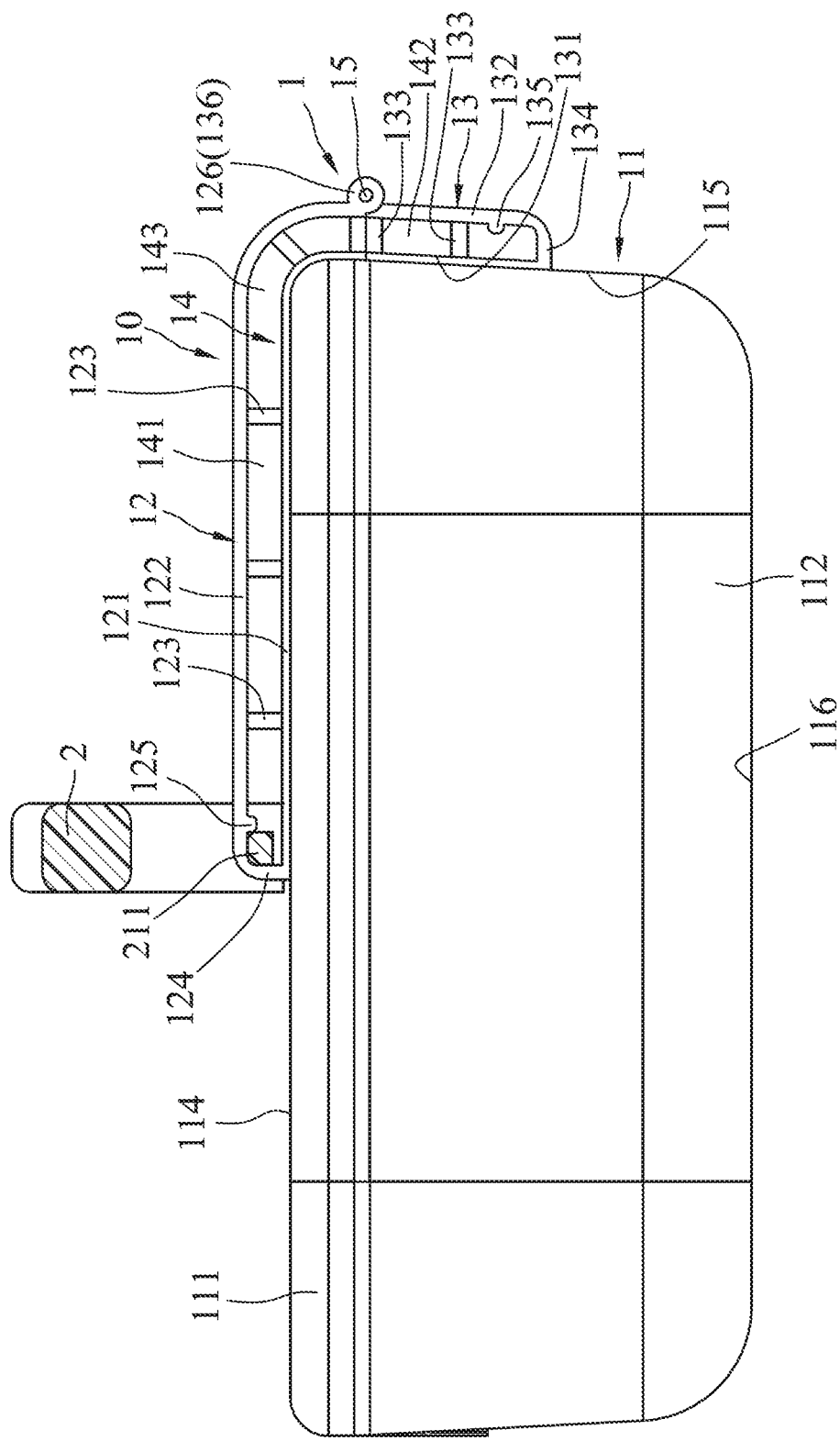
FIG. 4 is a partial cross-sectional view illustrating the containing device in the first carrying position according to the first embodiment of the present invention.

Referring to FIGS. 1, 2 and 4, in the present embodiment, the first base body 111 is a cover. The first base body 111 includes a first surface 114 which is arranged horizontally and faces upwards in the first carrying position, and includes a second base body 112 which is a box having a depth. The second base body 112 has a second surface 115 which is perpendicular in the first carrying position. In the present embodiment, the second surface 115 and the first surface 114 are perpendicular to each other and together form a right angle, but the angle may also be an acute angle or an obtuse angle. The second base body 112 further includes a third surface 116 perpendicular to the first surface 114, and the first surface 114 has a recessed area 117 adjacent to the second surface 115.

The sliding rail unit 10 can be directly formed integrally with the storage base 11 or can be separately manufactured and then fixed to the storage base 11. Preferably, the sliding rail unit 10 is manufactured independently and combined with the handle 2 to be installed on the storage base 11, so that the sliding rail unit 10 combined with the handle 2 can be mounted on any kind of storage bases 11, which allows convenient manufacture. In the present embodiment, the sliding rail unit 10 is extended from the first surface 114 to the second surface 115 of the storage base 11 and allows the first base body 111 to be opened or closed with respect to the second base body 112. In alternative embodiments, the sliding rail unit 10 can be extended from the second surface 115 to the third surface 116 of the second base body 112. That is to say, the present invention does not limit the sliding rail unit 10 to be connected to the first base body 111 or the second base body 112.

The sliding rail unit 10 has a first sliding base 12 fixedly mounted on the first base body 111, a second sliding base 13 fixedly mounted on the second base body 112, and two sliding slots 14 crossing the first sliding base 12 and the second sliding base 13 and arranged on two opposite sides, and a pin 15 rotatably connecting the first sliding base 12 to the second sliding base 13. The first sliding base 12 has a first bottom wall 121 coupled to the recessed area 117 of the first surface 114 and having an L shape, a first guide wall 122 parallel to and spaced apart from the first bottom wall 121, a plurality of first connection walls 123 each having a width shorter than a width of the first bottom wall 121 and vertically connected between the first bottom wall 121 and the first guide wall 122, and a first side wall 124 connected between the first bottom wall 121 and the first guide wall 122, a first protruding bar 125 protruding from the first guide wall 122 toward the first bottom wall 121, and two first axial tubes 126 (only one axial tube 126 is shown in the drawings) protruding from the first guide wall 122. The first protruding bar 125 is disposed adjacent to the first side wall 124.

The second sliding base 13 has a second bottom wall 131 coupled to the second surface 115 and in contact with the first bottom wall 121, and a second guide wall 132 parallel to and spaced apart from the second bottom wall 131 and in contact with the first guide wall 122, a plurality of second connection walls 133 which have a narrowed width and connected between the second bottom wall 131 and the second guide wall 132, a second side wall 134 connected between the second guide wall 132 and the second bottom wall 131, a second protruding bar 135 disposed adjacent to the second side wall 134 and protruding from the second guide wall 132 toward the second bottom wall 131, and a second axial tube 136 protruding from the second guide wall 132.

The pin 15 is inserted through the corresponding first axial tube 126 and the second axial tube 136, so that the first sliding base 12 can be pivoted relative to the second sliding base 13. The first sliding base 12 is coupled to the first base body 111, and the second sliding base 13 is coupled to the second base body 112, so the first base body 111 can be opened and closed with respect to the second base body 112. In the present embodiment, the first axial tube 126, the second axial tube 136 and the pin 15 together forms a pivotal structure; however, the present invention is not limited to this pivotal structure. The sliding slots 14 are disposed among the first bottom wall 121, the second bottom wall 131, the first guide wall 122, and the second guide wall 132, and are disposed at opposite sides with respect to the first connection wall 123 and the second connection wall 133. Each sliding slot 14 has a first sliding section 141 disposed corresponding to the first surface 114, a second sliding section 142 disposed corresponding to the second surface 115, and a turning section 143 connected between the first sliding section 141 and the second sliding section 142.

The handle 2 has two sliding portions 21 spaced apart from each other and has a connection portion 22 connected to the sliding portions 21. Each of the sliding portions 21 has a sliding block 211 extended into the corresponding sliding slot 14.

Figure 5:
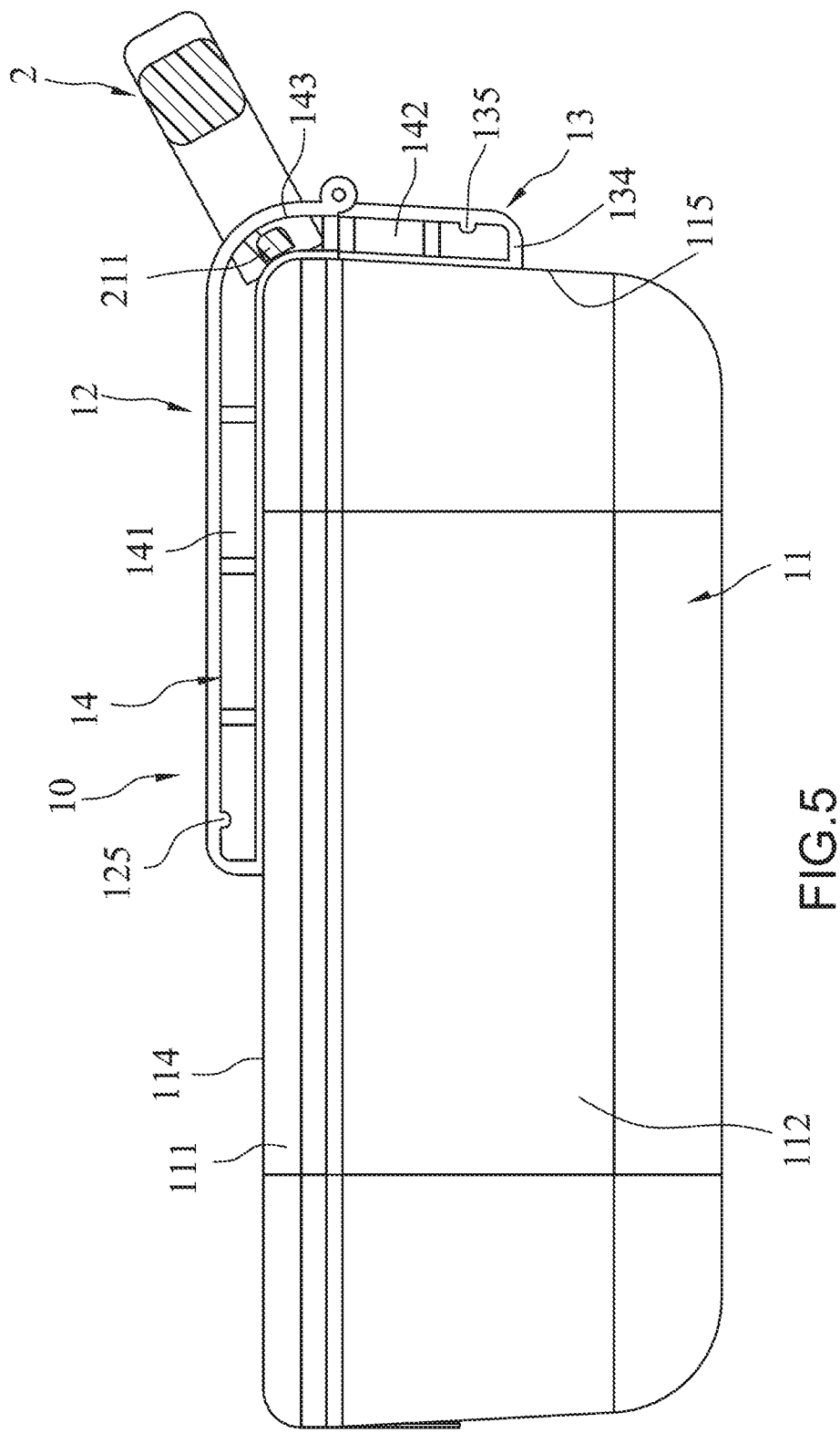
FIG. 5 is another partial cross-sectional view illustrating the containing device in the first carrying position shown in FIG. 4 is changed to the second carrying position.

Referring to FIGS. 3, 4 and 5, in the present embodiment, the containing device is in the first carrying position shown in FIG. 4. The handle 2 is perpendicular to the first surface 114 and is disposed adjacent to a geometric center of the first surface 114. The first surface 114 of the storage base 11 is arranged horizontally and faces upward. At this point, the sliding blocks 211 of the handle 2 are respectively disposed corresponding to the first sliding sections 141 of the sliding slots 14 and are limited between the first side wall 124 and the first protruding bar 125 of the first sliding base 12. In other words, the first side wall 124 can prevent each sliding block 211 from sliding out of the corresponding sliding slot 14.

When the containing device is to be switched from the first carrying position of FIG. 4 to the second carrying position of FIG. 3, a user first lowers the handle 2 to make the sliding blocks 211 lower than the first protruding bar 125; next, the handle 2 is gradually moved from the first sliding section 141 of each sliding slot 14 to the turning section 143; and then the handle is further moved to the second sliding section 142 of each sliding slot 14. When the sliding block 211 of the handle 2 is disposed between the second protruding bar 135 and the second side wall 134, the sliding block 211 is limited between the second protruding bar 135 and the second side wall 134 by lifting the handle 2 upwards. The second side wall 134 prevents each sliding block 211 from sliding out of the corresponding sliding slot 14. At this point, the containing device is switched to the second carrying position shown in FIG. 3, the second surface 115 of the storage box 11 is disposed horizontally and faces upward, and the handle 2 is adjacent to a geometric center of the second surface 115.

Figure 6:
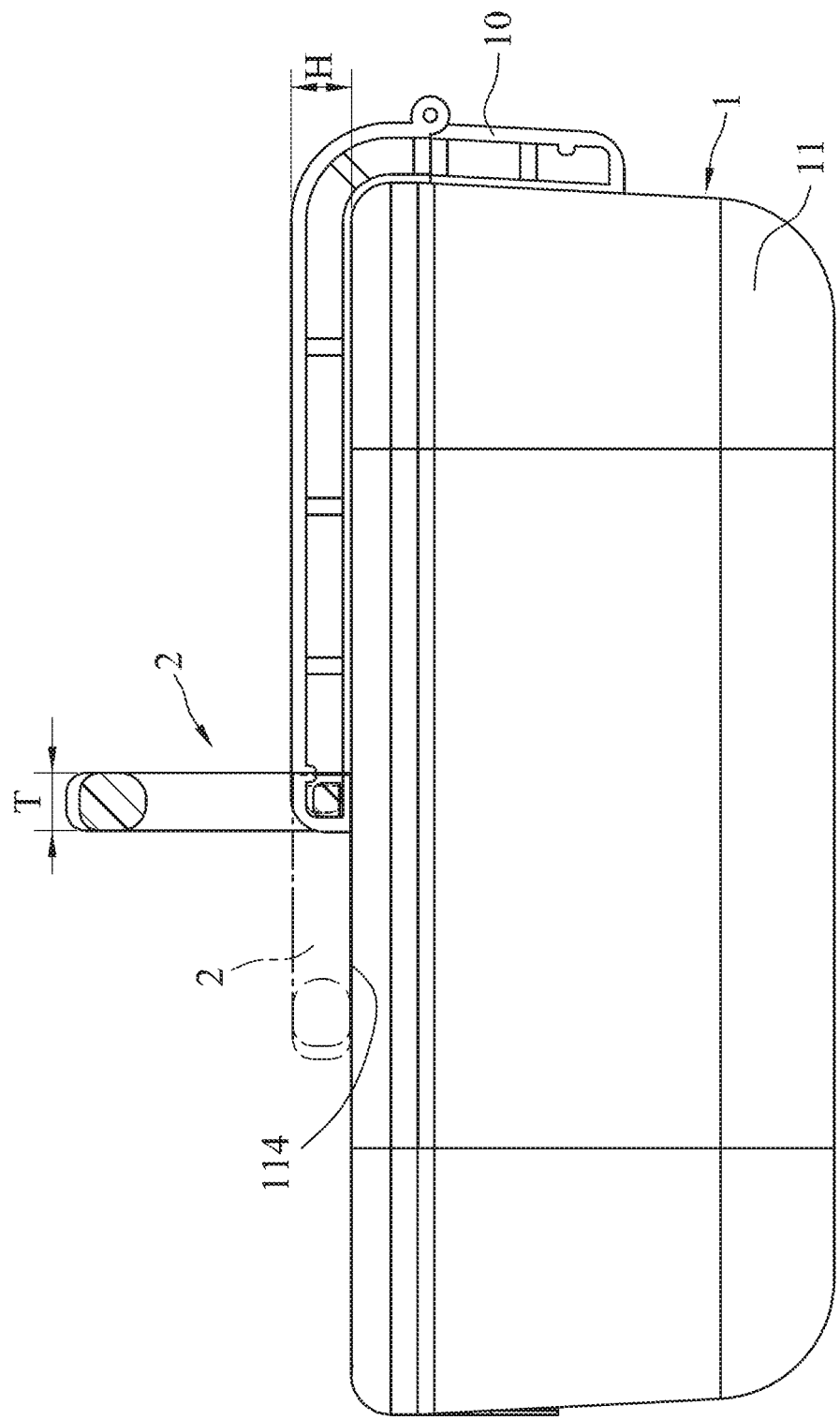
FIG. 6 is another partial cross-sectional view illustrating the containing device according to a second embodiment of the present invention.

Please refer to FIG. 6 showing the containing device according to a second embodiment of the present invention. The containing device of the second embodiment has a structure similar to the structure of the first embodiment mentioned above since the first embodiment and the second embodiment both have the container 1 and the handle 2. The second embodiment is different from the first embodiment in that, a thickness T of the handle 2 is reduced. In other words, the thickness T of the handle 2 is not greater than (less than or equal to) a height H by which the sliding rail unit 10 protrudes beyond the storage base 11. Therefore, when the handle 2 is pivoted and laid flat on the first surface 114 of the storage base 11, it will be flush with the sliding rail unit 10. By matching the thickness T of the handle 2 with the height H by which the sliding rail unit 10 protrudes beyond the storage base 11, it is convenient to stack a plurality of the containing devices one on top of another to improve stability of stacking.

Figure 7:
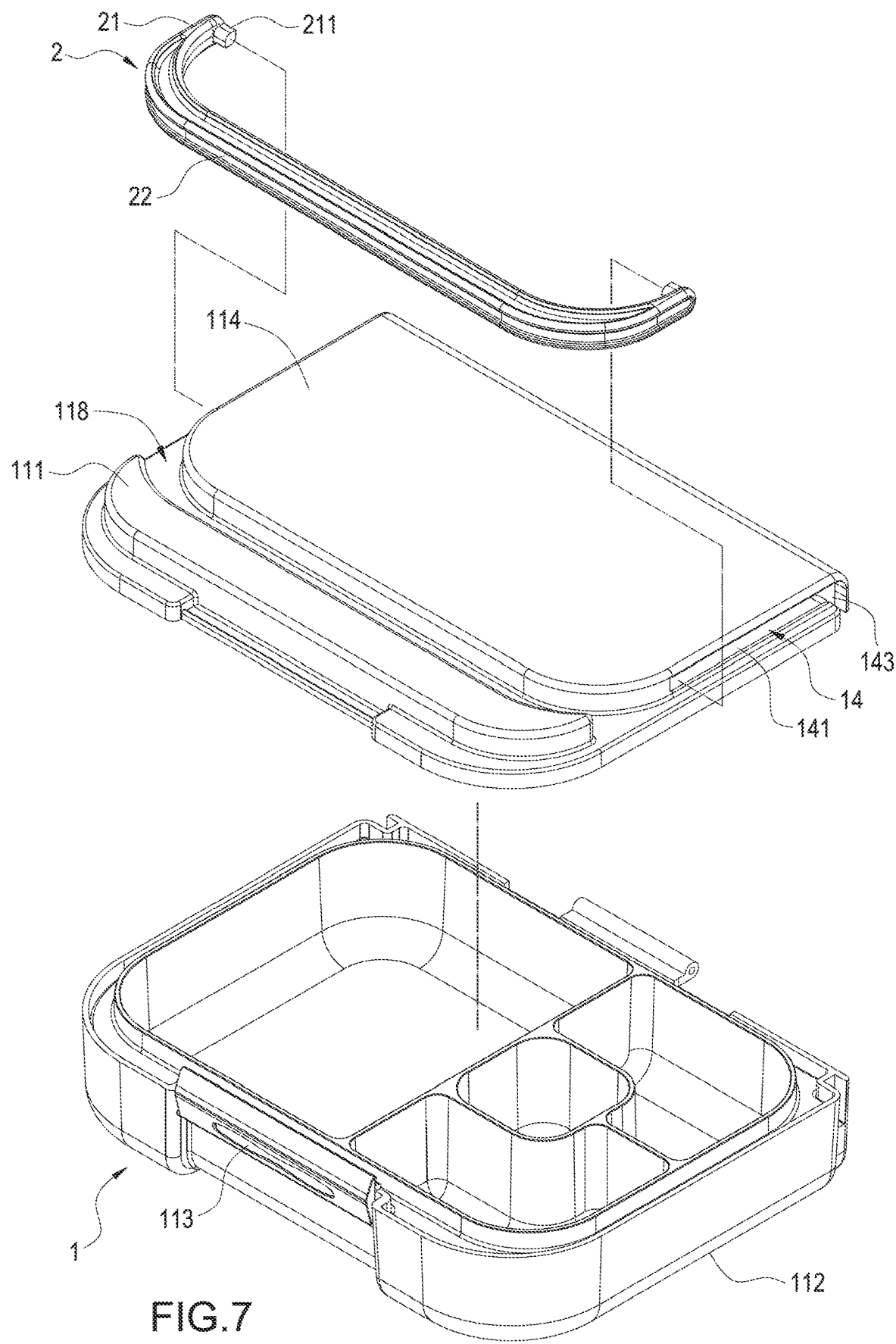
FIG. 7 is a partially exploded perspective view illustrating the containing device according to a third embodiment of the present invention.
Figure 8:
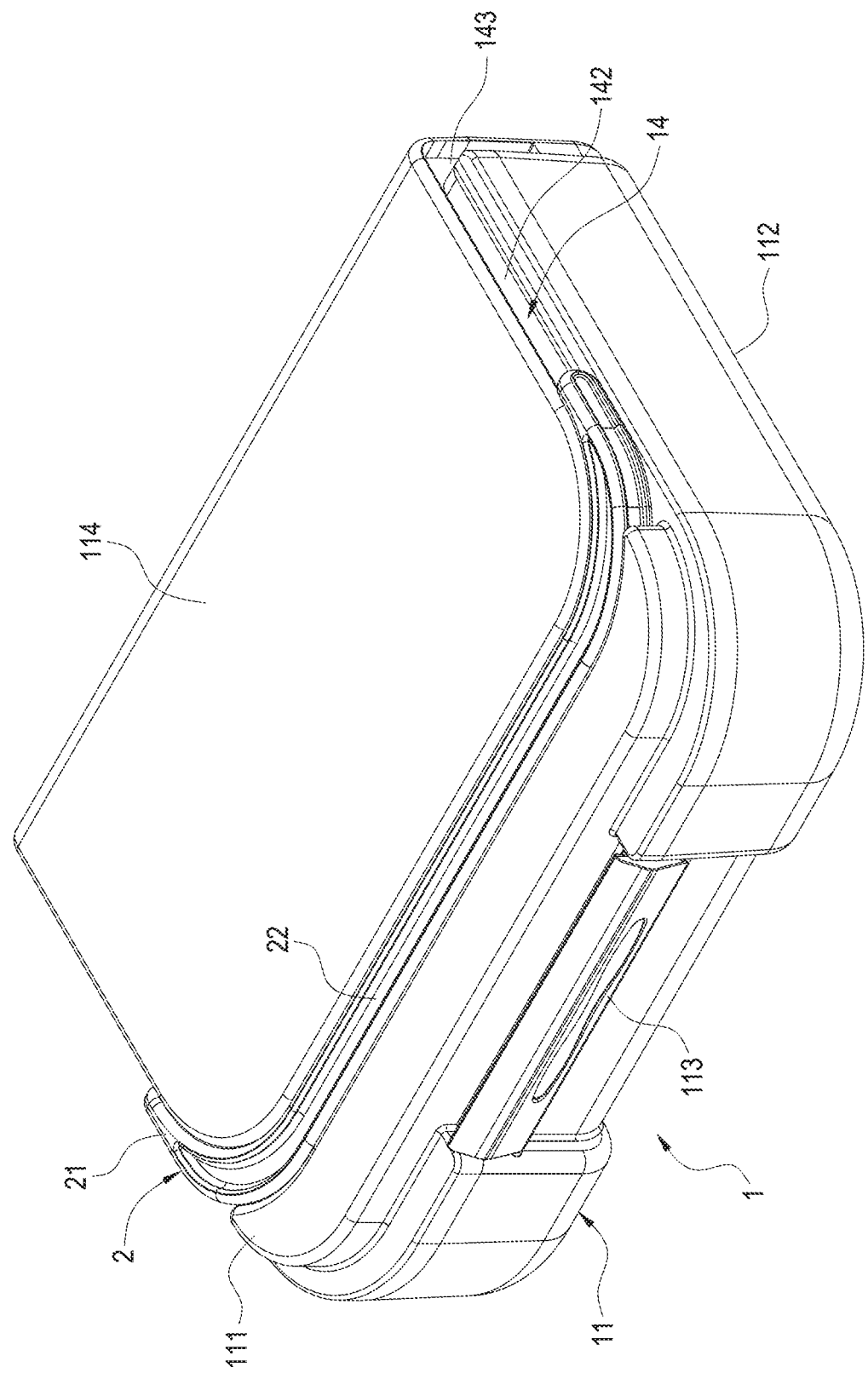
FIG. 8 is a perspective view illustrating the containing device according the third embodiment of the present invention.
Figure 9:
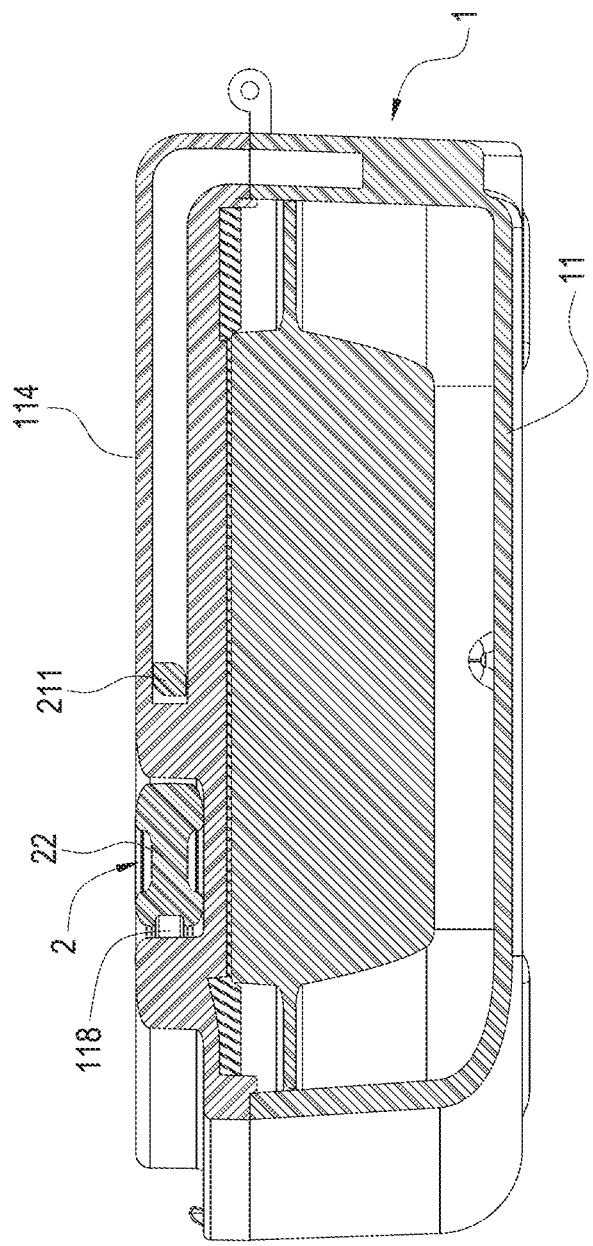
FIG. 9 is a cross-sectional view illustrating the containing device according to the third embodiment of the present invention.

Referring to FIGS. 7, 8, and 9 showing the containing device according to a third embodiment of the present invention, the containing device of the third embodiment of the present invention is also constructed similarly to the first and second embodiments since the containing device of the third embodiment also includes the container 1 and the handle 2. The third embodiment is different from the first and second embodiments in that, the first sliding rail base 12 is omitted, and the first sliding section 141 and the turning section 143 of the sliding slot 14 are directly arranged in the first base body 111 and are joined together with the second sliding section 142 of the second sliding rail base 13 to form the sliding slot 14; a recess 118 arranged corresponding to the handle 2 and matched with a shape of the handle 2 is defined in the first surface 114 of the first base body 111. The recess 118 and the sliding slot 14 can be in the same horizontal level, so that the handle 2 can be received in the recess 118 when not in use for convenience and aesthetics.

Referring to FIG. 10, the present invention can include one or more elastic restriction members 16 in the first base body 111, the first sliding base 12 or the second sliding base 13. The elastic restriction member 16 includes a blocker 160 and an elastic element 161 for pushing the blocker 160 to the sliding slot 14. The elastic restriction member 16 can be disposed in the first sliding section 141 and the second sliding section 142 of the sliding slot 14, and is disposed corresponding to the sliding block 211 and arranged adjacent to the first carrying position and the second carrying position. When the sliding block 211 is forced to pass through the elastic restriction member 16, the elastic restriction member 16 functions as the first protruding bar 125 and the second protruding bar 135 to thereby limiting the sliding block 211 in a predetermined position.

From the above description, it can be known that the containing device of the present invention has a creative structure by which a lifting direction of the containing device can be changed. That is to say, when the containing device is in the first carrying position, the handle 2 is adjacent to the geometric center of the substantially square-shaped first surface 114, so articles placed inside the container 1 can be placed tidily. When the containing device is switched to the second carrying position, the handle 2 is adjacent to the geometric center of the rectangular second surface 115, so the containing device can be carried firmly and stably. In addition to that, since the container 1 is erected when the containing device is in the second carrying position, the user is prevented from being collided or rubbed often by the containing device and can carry the containing device conveniently. On the contrary, because the container 1 is horizontal when the user carries the containing device in the first carrying position, the containing device in the first carrying position is very easy to collide or rub an outer surface of a thigh of the user and causes discomfort. The present invention allows the user to carry the containing device conveniently, and is indeed a novel and practical invention.

It should be noted that the sliding rail unit 10 of the present invention may also have only one sliding slot 14. In this configuration, the handle is changed to a T-shaped structure or the like. The present invention does not limit to the containing device having two sliding slots 14. In addition, the sliding block 211 of the handle 2 can also be changed into a silicone ring or the like, so that the sliding block 211 not only can slide in the corresponding sliding slot 14 but also can be positioned in any desired position. In addition, the present invention can have more than one first surface 114 and more than one second surface 115; the present invention is not limited to a particular number of the first surface 114 or the second surface 115. For example, two first surfaces 114, two second surfaces 115 and two sliding slots 14 extended from the first surface 114 to the second surface 115 are disposed at two sides of the first base body 111; and the sliding block 211 of the handle 2 is slidable in the corresponding sliding slot 14.

In summary, the present invention can certainly achieve the anticipated objects and solve the problems of conventional techniques, and has novelty and non-obviousness, so the present invention completely meets the requirements of patentability. Therefore, a request to patent the present invention is filed according to patent laws. Examination is kindly requested, and allowance of the present invention is solicited to protect the rights of the inventor.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A containing device having a slidable handle, comprising:
   a container (1), including a first surface (114), a second surface (115) and at least one sliding slot (14) extended from the first surface (114) to the second surface (115), the sliding slot (14) including a first sliding section (141) disposed corresponding to the first surface (114), a second sliding section (142) disposed corresponding to the second surface (115), and a turning section (143) connected between the first sliding section (141) and the second sliding section (142); and
   a handle (2) being slidable in the sliding slot (14), the handle (2) being assembled onto the container (1),
   wherein the handle (2) has two sliding portions (21) spaced apart from each other and has a connection portion (22) connected to the sliding portions (21), and each of the sliding portions (21) has a sliding block (211) extended into the corresponding sliding slot (14); and
   wherein the sliding block (211) is slidable in the sliding slot (14) and is able to be positioned in the first sliding section (141) corresponding to the first surface (114), or to be positioned in the second sliding section (142) corresponding to the second surface (115), such that the handle (2) is able to positioned in a first carrying position on the first surface (114) that supports the containing device at a geometric center of the first surface (114) or a second carrying position on the second surface (115) that supports the containing device at a geometric center of the second surface (115).

2. The containing device having the slidable handle according to claim 1, wherein the first surface (114) is perpendicular to the second surface (115).

3. The containing device having the slidable handle according to claim 1, wherein the container (1) comprises a storage base (11) and a sliding rail unit (10), the storage base (11) comprises a first base body (111) including the first surface (114) and a second base body (112) including the second surface (115), the second base body (112) is opened or closed with respect to the first base body (111), the sliding rail unit (10) includes a first sliding base (12) mounted to the first base body (111) and includes a second sliding base (13) mounted to the second base body (112), the second sliding base (13) is pivotally connected to the first sliding base (12), and the sliding slot (14) crosses the first sliding base (12) and the second sliding base (13).

4. The containing device having the slidable handle according to claim 3, wherein the sliding rail unit (10) includes two sliding slots (14) on two opposite sides.

5. The containing device having the slidable handle according to claim 4, wherein the first sliding base (12)

includes an L-shaped first bottom wall (121) coupled to the first base body (111), a first guide wall (122) disposed spaced apart from the first bottom wall (121), and a first side wall (124) connected between the first bottom wall (121) and the first guide wall (122) to prevent the sliding block (211) from sliding out of the sliding slot (14); the first bottom wall (121) and the first guide wall (122) are disposed at opposite sides of the sliding slot (14); the second sliding base (13) includes a second bottom wall (131) coupled to the second base body (112) and in contact with the first bottom wall (121), a second guide wall (132) spaced apart from the second bottom wall (131) and in contact with the first guide wall (122), and a second side wall (134) connected between the second bottom wall (131) and the second guide wall (134) to prevent the sliding block (211) from sliding out of the sliding slot (14).

6. The containing device having the slidable handle according to claim 5, wherein the first sliding base (12) further includes a first protruding bar (125) protruding from the first guide wall (122) toward the first bottom wall (121) and disposed adjacent to the first side wall (124); the second sliding base (13) further includes a second protruding bar (135) protruding from the second guide wall (132) toward the second bottom wall (131) and disposed adjacent to the second side wall (134); when the containing device is in the first carrying position, the sliding block (211) of the handle (2) is limited between the first side wall (124) and the first protruding bar (125); and when the containing device is in the second carrying position, the sliding block (211) of the handle (2) is limited between the second side wall (134) and the second protruding bar (135).

7. The containing device having the slidable handle according to claim 3, wherein the first surface (114) of the first base body (111) includes a recessed area (117) for mounting the first sliding base (12).

8. The containing device having the slidable handle according to claim 3, wherein the first sliding base (12) includes at least one first axial tube (126), the second sliding base (13) includes a second axial tube (136), and the sliding rail unit (10) further includes a pin (15) inserted through the first axial tube (126) and the second axial tube (136).

9. The containing device having the slidable handle according to claim 3, wherein the first surface (114) is perpendicular to the second surface (115).

10. The containing device having the slidable handle according to claim 3, wherein a thickness of the handle (2) is less than or equal to a height by which the sliding rail unit (10) protrudes from the storage base (11).

11. The containing device having the slidable handle according to claim 3, wherein the container (1) includes a storage base (11), the storage base (11) comprises a first base body (111) including the first surface (114) and a second base body (112) including the second surface (115), the second base body (112) is opened or closed with respect to the first base body (111), the first sliding section (141) of the sliding slot (14) is disposed in the first base body (111), the second base body (112) is connected to the second sliding base (13) pivotally disposed on the first base body (111), and the second sliding section (142) of the sliding slot (14) is disposed in the second sliding base (13).

12. The containing device having the slidable handle according to claim 11, wherein the turning section (143) of the sliding slot (14) is disposed in the first base body (111).

13. The containing device having the slidable handle according to claim 1, wherein a recess (118) disposed corresponding to the handle (2) is defined in the first surface (114).

14. The containing device having the slidable handle according to claim 1, further comprising at least one elastic restriction member (16), wherein the elastic restriction member (16) includes a blocker (160) and an elastic element (161) for pushing the blocker (160) to the sliding slot (14).

* * * * *